US012810769B2

(12) United States Patent
Yi et al.

(10) Patent No.: US 12,810,769 B2
(45) Date of Patent: Nov. 24, 2026

(54) DISPLAY DEVICE

(71) Applicant: SAMSUNG ELECTRONICS CO., LTD., Suwon-si (KR)

(72) Inventors: Sanghun Yi, Suwon-si (KR); Sangwon Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 19/092,748

(22) Filed: Mar. 27, 2025

(65) Prior Publication Data

US 2025/0252892 A1 Aug. 7, 2025

Related U.S. Application Data

(63) Continuation of application No. PCT/KR2023/015140, filed on Sep. 27, 2023.

(30) Foreign Application Priority Data

Nov. 23, 2022 (KR) ........................ 10-2022-0158192

(51) Int. Cl.
*G09G 3/20* (2006.01)
*G09G 3/32* (2016.01)

(52) U.S. Cl.
CPC ............. *G09G 3/2096* (2013.01); *G09G 3/32* (2013.01); *G09G 2330/021* (2013.01)

(58) Field of Classification Search
CPC ............... G09G 3/3655; G09G 3/3688; G09G 2310/0248
See application file for complete search history.

(56) References Cited

U.S. PATENT DOCUMENTS 6,150,800 A 11/2000 Kinoshita et al.
8,194,379 B2 6/2012 Herr et al.
(Continued)

FOREIGN PATENT DOCUMENTS

JP 2020-61324 A 4/2020
KR 10-0606529 B1 7/2006
(Continued)

OTHER PUBLICATIONS

International Search Report and Written Opinion (PCT/ISA/210 and PCT/ISA/237) dated Jan. 24, 2024, issued by International Searching Authority for International Application No. PCT/KR2023/015140.
(Continued)

*Primary Examiner* — Van N Chow
(74) *Attorney, Agent, or Firm* — Sughrue Mion, PLLC

(57) ABSTRACT

A display device includes: a first timing controller; a first power supply device configured to provide, based on a first alternating current (AC) power being transferred through a first AC power cable, a first direct current (DC) voltage to the first timing controller based on the first AC power; a second timing controller; a second power supply device configured to provide, based on a second AC power being transferred though a second AC power cable, a second DC voltage to the second timing controller based on the second AC power; and a main board including at least one processor configured to: based on the first AC power cable being detected as connected to the first AC power, and based on the second AC power cable being detected as connected to the second AC power, apply driving signals to the first and the second timing controllers.

16 Claims, 5 Drawing Sheets

(56) References Cited

U.S. PATENT DOCUMENTS

| | | | | |
|---|---|---|---|---|
| 8,339,055 | B2 | 12/2012 | Zhan et al. | |
| 9,058,773 | B2 | 6/2015 | Park | |
| 9,240,290 | B2 | 1/2016 | Kim | |
| 9,760,975 | B2 | 9/2017 | Kim et al. | |
| 11,500,437 | B2 | 11/2022 | Lee et al. | |
| 11,538,387 | B1 * | 12/2022 | Lee | G09G 3/20 |
| 11,735,122 | B2 | 8/2023 | Kim et al. | |
| 2007/0296673 | A1 * | 12/2007 | Kang | G09G 3/3406 345/92 |
| 2010/0091000 | A1 * | 4/2010 | Lee | G09G 3/3696 345/87 |
| 2013/0120045 | A1 | 5/2013 | Hedge | |
| 2014/0362071 | A1 * | 12/2014 | Jung | H05B 45/44 345/82 |
| 2015/0371601 | A1 | 12/2015 | Kim | |
| 2016/0125800 | A1 | 5/2016 | Kim | |
| 2017/0076658 | A1 | 3/2017 | Yeo et al. | |
| 2019/0114980 | A1 * | 4/2019 | Kim | G02F 1/136213 |
| 2020/0327851 | A1 * | 10/2020 | Seo | G09G 3/32 |
| 2021/0142704 | A1 | 5/2021 | Kim et al. | |
| 2021/0327391 | A1 * | 10/2021 | Wang | G09G 5/006 |
| 2022/0208938 | A1 * | 6/2022 | Kim | G09G 3/3225 |

FOREIGN PATENT DOCUMENTS

| | | | |
|---|---|---|---|
| KR | 10-2011-0087913 | A | 8/2011 |
| KR | 10-1057958 | B1 | 8/2011 |
| KR | 10-2012-0128815 | A | 11/2012 |
| KR | 10-1259209 | B1 | 4/2013 |
| KR | 10-1682722 | B1 | 12/2016 |
| KR | 10-2017-0033198 | A | 3/2017 |
| KR | 10-2017-0066838 | A | 6/2017 |
| KR | 10-2017-0126761 | A | 11/2017 |
| KR | 10-2018-0104381 | A | 9/2018 |
| KR | 10-2144917 | B1 | 8/2020 |
| KR | 10-2021-0082709 | A | 7/2021 |
| KR | 10-2021-0132950 | A | 11/2021 |
| KR | 10-2022-0080312 | A | 6/2022 |

OTHER PUBLICATIONS

Communication dated Aug. 26, 2025, issued by the European Patent Office in European Application No. 23894791.5.

Communication issued Feb. 2, 2026 by the Korean Ministry of Intellectual Property in Korean Patent Application No. 10-2022-0158192.

* cited by examiner

DISPLAY DEVICE

CROSS REFERENCE TO RELATED APPLICATIONS

This application is a continuation of International Application No. PCT/KR2023/015140, filed on Sep. 27, 2023, in the Korean Intellectual Property Receiving Office, which is based on and claims priority to Korean Patent Application No. 10-2022-0158192, filed on Nov. 23, 2022, in the Korean Intellectual Property Office, the disclosures of which are incorporated by reference herein in their entireties.

BACKGROUND

1. Field

The disclosure relates to a display device, and more particularly, to a display device that receives power through a plurality of alternating current (AC) power cables.

2. Description of Related Art

Generally, in display devices such as, for example, and without limitation, a television (TV), a monitor, a digital signage, a large format display (LFD), various LED displays, and the like, AC power cables of 10[A] specification are commonly used according to safety standards.

However, as display products that require power consumption of greater than or equal to 10[A] are being developed, a plurality of AC power cables may be necessary in one device. FIG. 1 shows an example of two AC power cables 500-1 and 500-2 being used in one display device 1000.

As described above, there may be a problem with products that use a plurality of AC power cables due to a countermeasure not being prepared for rush current which can occur according to an order by which the AC power cables are connected to power.

SUMMARY

According to an aspect of the disclosure, a display device may include: a first timing controller; a first power supply device configured to provide, based on a first alternating current (AC) power being transferred through a first AC power cable, a first direct current (DC) voltage to the first timing controller based on the first AC power; a second timing controller; a second power supply device configured to provide, based on a second AC power being transferred though a second AC power cable, a second DC voltage to the second timing controller based on the second AC power; and a main board including at least one processor, where the at least one processor is configured to: based on the first AC power cable being detected as connected to the first AC power based on the first DC voltage transferred from the first timing controller, and based on the second AC power cable being detected as connected to the second AC power based on the second DC voltage transferred from the second timing controller, apply driving signals to the first timing controller and the second timing controller.

The at least one processor may be further configured to: based on at least one of the first DC voltage not being transferred from the first timing controller or the second DC voltage not being transferred from the second timing controller, not apply the driving signals to the first timing controller and the second timing controller.

The main board may further include: an AND gate circuit including: a first input terminal configured to receive the first DC voltage from the first timing controller, a second input terminal configured to receive the second DC voltage from the second timing controller, and an output terminal, where the at least on processor is further configured to detect whether the first AC power cable is connected to the first AC power and the second AC power cable is connected to the second AC power based on an output value of the AND gate circuit.

The AND gate circuit may further include a bipolar junction transistor (BJT) or a metal oxide semiconductor field effect transistor (MOSFET).

The display device may further include: a first cable connecting the first timing controller with the main board; and a second cable connecting the second timing controller with the main board, where the at least one processor is further configured to: apply video data and the driving signals to the first timing controller through the first cable and to the second timing controller through the second cable, and receive the first DC voltage from the first timing controller through the first cable and the second DC voltage from the second timing controller through the second cable.

Each of the first cable and the second cable may be a one connect module (OCM) cable.

The display device may further include: a first AC inlet board configured to receive the first AC power through the first AC power cable, and transfer the first AC power to the first power supply device; and a second AC inlet board configured to receive the second AC power through the second AC power cable, and transfer the second AC power to the second power supply device.

The main board, the first AC inlet board, and the second AC inlet board may be connected via a daisy chain configuration.

The first power supply device may be further configured to: based on the first AC power cable being connected to the first AC power, apply a power supply ON (PSON) signal to the main board based on the first AC power transferred through the first AC inlet board, where the at least one processor is further configured to apply, based on the PSON signal, a relay ON signal to the first AC inlet board.

The first AC inlet board may be further configured to transfer, based on the first AC power cable being connected to the first AC power, the first AC power to the first power supply device, where the second AC inlet board is further configured to, based on the second AC power cable being connected to the second AC power, and the relay ON signal being applied to the first AC inlet board, transfer the second AC power to the second power supply device.

The display device may further include: a first cable connecting the first timing controller with the main board; a second cable connecting the second timing controller with the main board; a third timing controller; a third power supply device configured to apply, based on the first AC power being transferred through a first cable, a third DC voltage to the third timing controller based on the first AC power; a fourth timing controller; and a fourth power supply device configured to apply, based on the second AC power being transferred through a second cable, a fourth DC voltage to the fourth timing controller based on the second AC power, where the at least one processor is further configured to: based on the first AC power cable being detected as connected to the first AC power based on the first DC voltage transferred from the first timing controller and the third DC voltage transferred from the third timing controller, and based on the second AC power cable being detected as connected to the second AC power based on the second DC voltage transferred from the second timing controller and the fourth DC voltage transferred from the fourth timing controller, apply the driving signals to the first timing controller, the second timing controller, the third timing controller, and the fourth timing controller.

The at least one processor may be further configured to: based on at least one of the first DC voltage not being transferred from the first timing controller, the second DC voltage not being transferred from the second timing controller, the third DC voltage not being transferred from the third timing controller, or the fourth DC voltage not being transferred from the fourth timing controller, not apply the driving signals to the first timing controller, the second timing controller, the third timing controller, and the fourth timing controller.

The main board may further include: an AND gate circuit including: a first input terminal configured to receive the first DC voltage from the first timing controller, a second input terminal configured to receive the second DC voltage from the second timing controller, a third input terminal configured to receive the third DC voltage from the third timing controller, a fourth input terminal configured to receive the fourth DC voltage from the fourth timing controller, and an output terminal, where the at least on processor is further configured to: detect whether the first AC power cable is connected to the first AC power and the second AC power cable is connected to the second AC power based on an output value of the AND gate circuit.

The display device may further include: a third cable connecting the third timing controller with the main board; and a fourth cable connecting the fourth timing controller with the main board, where the at least one processor is further configured to: apply video data and the driving signals to the first timing controller through the first cable, to the second timing controller through the second cable, to the third timing controller through the third cable, and to the fourth timing controller through the fourth cable, respectively, and receive the first DC voltage from the first timing controller through the first cable, the second DC voltage from the second timing controller through the second cable, the third DC voltage from the third timing controller through the third cable, and the fourth DC voltage from the fourth timing controller through the fourth cable.

The display device may further include: a first AC inlet board configured to receive the first AC power through the first AC power cable, and transfer the first AC power to the first power supply device and the third power supply device; and a second AC inlet board configured to receive the second AC power through the second AC power cable, and transfer the input second AC power to the second power supply device and the fourth power supply device.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

In describing embodiments of the disclosure, in case it is determined that the detailed description of related known technologies may unnecessarily confuse the gist of the disclosure, the detailed description thereof will be omitted. In addition, redundant descriptions of same configurations will be omitted if possible.

Suffixes such as "part" for elements used in the description below have been added or used combined therewith considering its easiness in preparing the disclosure, and do not have meaning or role that distinguishes one another on its own.

Terms used in the disclosure have been used to describe embodiments herein and is not intended to limit the disclosure. A singular expression includes a plural expression, unless clearly specified otherwise in context.

It is to be understood that the terms such as "have" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

Expressions such as "1st", "2nd", "first" or "second" used in the disclosure may limit various elements regardless of order and/or importance, and may be used merely to distinguish one element from another element and not limit the relevant element.

When a certain element (e.g., a first element) is indicated as being "(operatively or communicatively) coupled with/to" or "connected to" another element (e.g., a second element), it may be understood as the certain element being directly coupled with/to the another element or as being coupled through other element (e.g., a third element). Conversely, when a certain element (e.g., first element) is indicated as "directly coupled with/to" or "directly connected to" another element (e.g., second element), it may be understood as the other element (e.g., third element) not being present between the certain element and the another element.

Throughout the disclosure, the expression "at least one of a, b or c" indicates only a, only b, only c, both a and b, both a and c, both b and c, all of a, b, and c, or variations thereof.

The terms used in the embodiments of the disclosure may be interpreted to have meanings generally understood to one of ordinary skill in the art unless otherwise defined.

Various embodiments of the disclosure will be described in detail below with reference to accompanied drawings.

Figure 1:
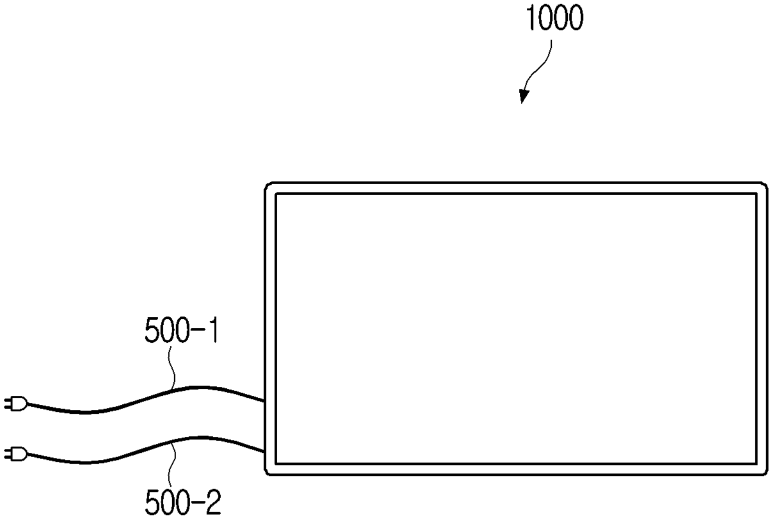
FIG. 1 is a diagram illustrating an example of a display device which uses a plurality of AC power cables.
Figure 2:
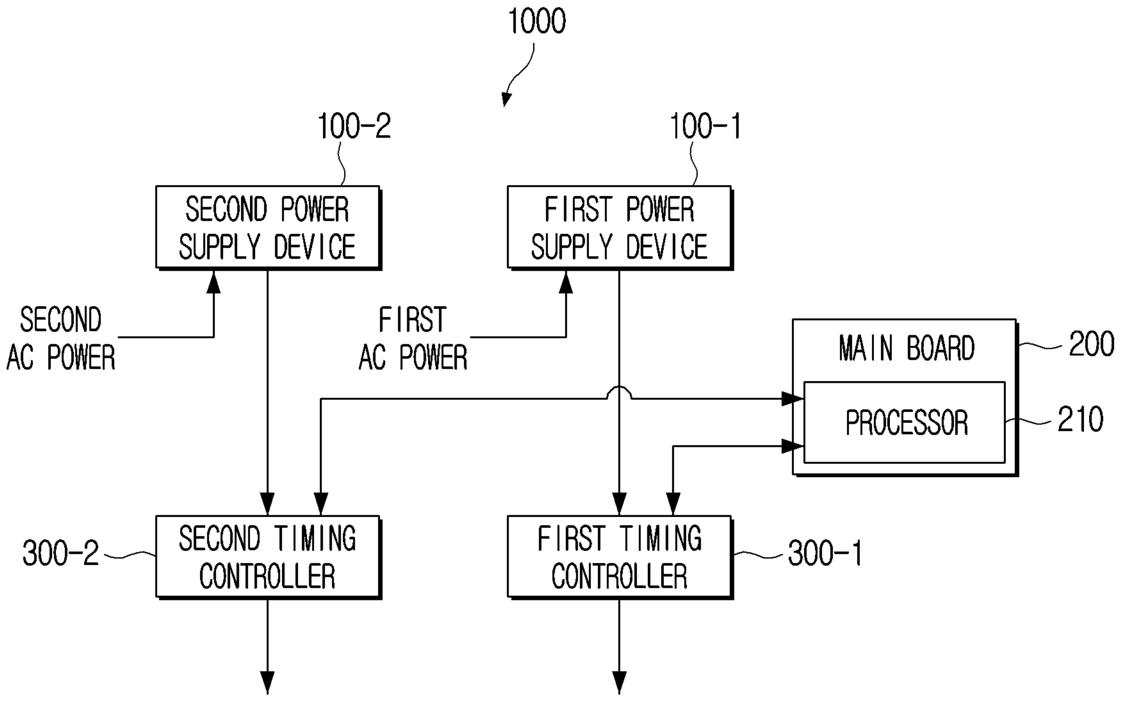
FIG. 2 is a diagram illustrating a configuration of a display device according to an embodiment of the disclosure.

FIG. 2 is a diagram illustrating a configuration of a display device according to an embodiment of the disclosure. In various embodiments of the disclosure, the display device 1000 may be implemented through various products such as, for example, and without limitation, a TV, a monitor, a digital signage, a large format display (LFD), an electronic frame, an electronic blackboard, and the like.

Display panels included in the display device 1000 may be implemented through various methods such as, for example, and without limitation, liquid crystal display (LCD) panels, light emitting diodes (LEDs), organic light emitting diodes (OLEDs), mini LEDs, micro LEDs, and the like. At this time, the display device 1000 may include modular display panels which combined a plurality of display modules, but embodiments are not limited thereto.

Referring to FIG. 2, the display device 1000 may include a first timing controller 300-1, a second timing controller 300-2, a first power supply device 100-1, a second power supply device 100-2, and a main board 200.

The first power supply device 100-1 may provide, based on first alternating current (AC) voltage being transferred through a first AC power cable, first direct current (DC) voltage to the first timing controller 300-1 based on the first AC voltage.

In addition, the first power supply device 100-1 may provide, based on the first AC voltage being transferred through the first AC power cable, a first control signal to the main board 200 based on the first AC voltage. At this time, the first control signal may be referred to as a power supply ON (PSON) signal, and may have a pre-set DC voltage value (e.g., 3.3[V]).

Meanwhile, a voltage value of the first DC voltage and a voltage value of the first control signal may be same or different according to an embodiment.

The second power supply device 100-2 may provide, based on second AC voltage being transferred through a second AC power cable, second DC voltage to the second timing controller 300-2 based on the second AC voltage.

The first power supply device 100-1 and the second power supply device 100-2 may be implemented as, for example, a switching mode power supply device (SMPS), but embodiments are not limited thereto.

The main board 200 may include a processor 210. The processor 210 may control the overall operation of the display device 1000. The processor 210 may include at least one processor. For example, the processor 210 may include one or more of a central processing unit (CPU), an application processor (AP), or a communication processor (CP).

The processor 210 may be implemented in a form of a system on chip (SOC) which includes several function blocks such as a microcontroller and a scaler, but embodiments are not limited thereto.

At this time, the microcontroller may be driven by the above-described PSON signal. Because the first power supply device 100-1 provides the PSON signal to the main board unless the first AC power cable is disconnected from the first AC power, the microcontroller may be operated at all times (e.g., even in a standby mode) unless the first AC power cable is disconnected from the first AC power.

Conversely, the scaler may be a part associated with image data driving, and video data input from the outside may be processed and provided to a timing controller. Because there is no need to display a screen while the display device 1000 is operating in a standby mode, the scaler may operate as necessary according to a control of the microcontroller (e.g., when the standby mode is unlocked, and operated in an operation mode for displaying an image).

Specifically, according to an embodiment of the disclosure, the processor 210 may apply, based on the first and second AC power cables being detected as connected to the first and second AC power based on the first and second DC voltage transferred from the first and second timing controllers 300-1 and 300-2, driving signals to the first and second timing controllers 300-1 and 300-2 respectively.

That is, the processor 210 may not apply, based on at least one of the first DC voltage or the second DC voltage not being transferred from the first and second timing controllers 300-1 and 300-2, the driving signals to the first and second timing controllers 300-1 and 300-2.

As described above, by applying the driving signals for driving the timing controllers to the first and second timing controllers 300-1 and 300-2 only when the first and second AC power cables are respectively connected to the first and second AC power, damage to a power supply device by a rush current, which can be generated according to an order by which the AC power cables are connected to power, may be prevented.

In the related art which operates regardless of whether the first and second AC power cables are connected to the first and second AC power, instances where rush current is generated are described as follows.

For example, it may be assumed that the first AC power cable is connected to the first AC power, but the second AC power cable is not connected to the second AC power. In this case, the first power supply device 100-1 may provide the PSON signal to the main board 200 based on the first AC power applied through the first AC power cable, and accordingly, the processor 210 (specifically, the microcontroller) may drive the timing controllers. That is, if the first AC power cable is connected to the first AC power, the first power supply device 100-1 may provide the PSON signal to the main board 200 based on the first AC power, and the microcontroller may apply the driving signals to the first timing controller 300-1 and the second timing controller 300-2.

Because the first timing controller 300-1 and the second timing controller 300-2 have completed driving preparations according to the driving signals while in a state in which the second AC power cable is not yet connected to the second AC power, a sudden rush current may then be generated in the second timing controller 300-2 as soon as the second AC power cable is connected to the second AC power, and the above becomes the reason of failure in the second power supply device 100-2.

However, as described above, according to an embodiment of the disclosure, the driving signals may be applied to the first and second timing controllers 300-1 and 300-2 only when the first and second AC power cables are all connected to the first and second AC power.

That is, because the PSON signal is not applied to the main board 200 if the first AC power cable is not connected to the first AC power, the driving signals may not be applied due to the microcontroller not operating, and because the first and second AC power cables are not all connected to the first and second AC power if the second AC power cable is not connected to the second AC power, the microcontroller may not apply the driving signals.

If the driving signals are not applied, the timing controllers 300-1 and 300-2 may not carry out driving preparations, and the rush current problem may not occur as in the above-described related art.

Various embodiments of the disclosure will be described in greater detail below with reference to FIG. 3 and FIG. 4.

Figure 3:
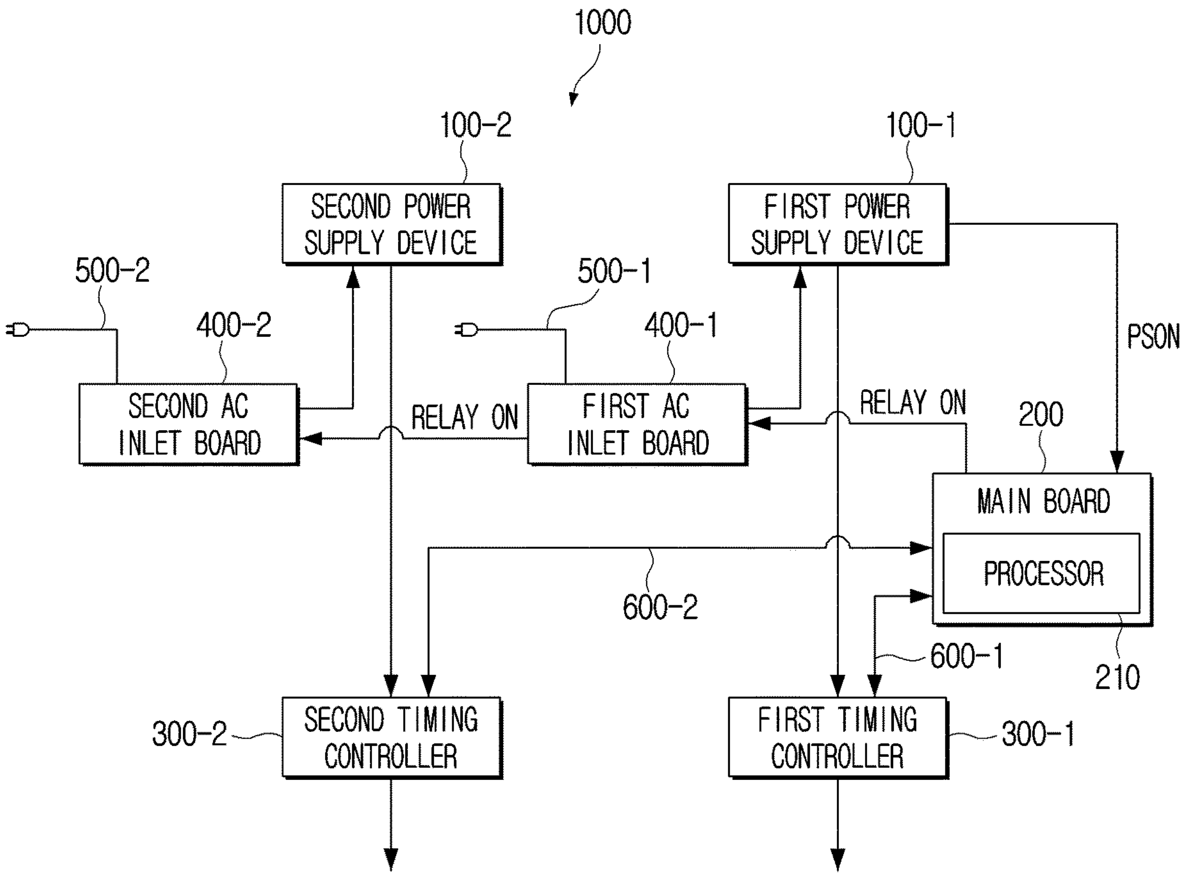
FIG. 3 is a diagram illustrating a configuration of a display device according to an embodiment of the disclosure.
Figure 4:
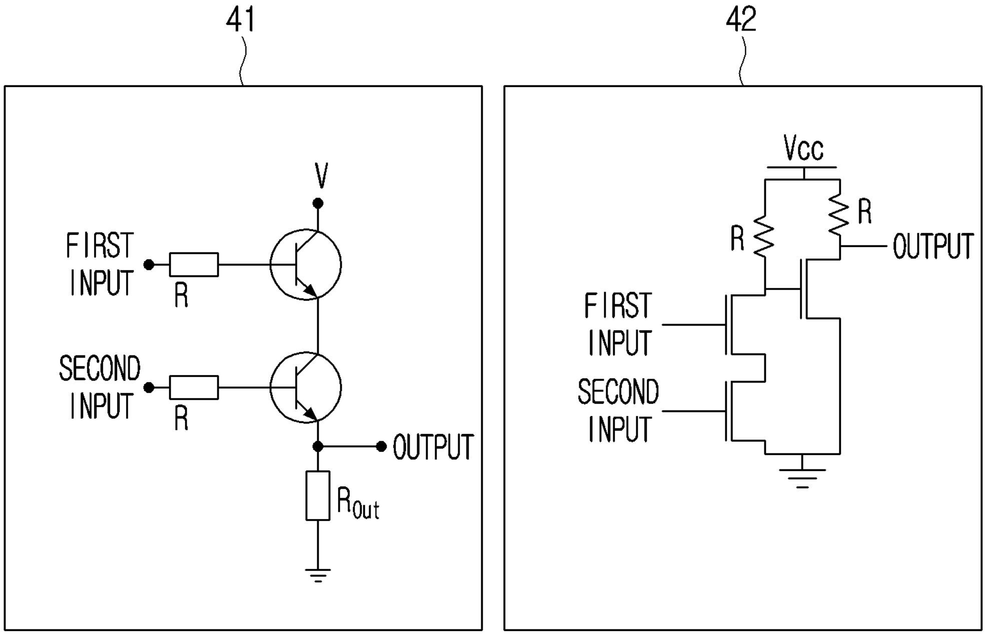
FIG. 4 is a circuit diagram of an AND gate according to an embodiment of an disclosure.

FIG. 3 is a diagram illustrating a configuration of a display device according to an embodiment of the disclosure. Referring to FIG. 3, the display device may include the first power supply device 100-1, the second power supply device 100-2, the main board 200, the first timing controller 300-1, the second timing controller 300-2, a first AC inlet board 400-1, a second AC inlet board 400-2, a first AC power cable 500-1, and a second AC power cable 500-2. In describing FIG. 3, redundant descriptions of same configurations as that described above through FIG. 2 will be omitted.

The first AC inlet board 400-1 may receive the first AC power through the first AC power cable 500-1, and transfer the input first AC power to the first power supply device 100-1. Specifically, the first AC inlet board 400-1 may transfer, based on the first AC power cable 500-1 being connected to the first AC power (or an electrical outlet through which the first AC power is supplied), the input first AC power to the first power supply device 100-1 as is without additional operation. When the first AC power is transferred, the first power supply device 100-1 may apply the PSON signal to the main board 200 based on the first AC power.

The second AC inlet board 400-2 may receive the second AC power through the second AC power cable 500-2, and transfer the input second AC power to the second power supply device 100-2. Specifically, the second AC inlet board 400-2 may transfer, based on the second AC power cable 500-2 being connected to the second AC power (or an electrical outlet through which the second AC power is supplied), and a second control signal being applied through the first AC inlet board 400-1, the input second AC power to the second power supply device 100-2.

At this time, the second control signal may be referred to as a relay ON signal, and may have the same pre-set DC voltage value (e.g., 3.3[V]) as the PSON signal, but embodiments are not limited thereto.

The processor 210 (specifically, the microcontroller of the main board 200 may apply, based on the PSON signal being applied from the first power supply device 100-1, the relay ON signal to the first AC inlet board 400-1.

According to an embodiment of the disclosure, in order to apply the relay ON signal applied from the main board 200 to the second AC inlet board 400-2, the main board 200, the first AC inlet board 400-1, and the second AC inlet board 400-2 may be connected through a daisy chain configuration. Accordingly, the first AC inlet board 400-1 may transfer, based on the relay ON signal being applied from the main board 200, the applied relay ON signal to the second AC inlet board 400-2.

For the above-described operation, the first and second AC inlet boards 400-1 and 400-2 may include switching elements. At this time, the switching elements may be semiconductor switching elements, but embodiments are not limited thereto.

The first power supply device 100-1 may convert, based on the first AC power being transferred from the first AC inlet board 400-1, the transferred first AC power to the first DC voltage, and provide the converted first DC voltage to the first timing controller 300-1. In addition, the second power supply device 100-2 may convert, based on the second AC power being transferred from the second AC inlet board 400-2, the transferred second AC power to the second DC voltage, and provide the converted second DC voltage to the second timing controller 300-2.

At this time, according to an embodiment of the disclosure, the first timing controller 300-1 may not use, even if the first DC voltage is applied, the applied first DC voltage until the driving signal is applied from the processor 210 (specifically, the microcontroller), and transfer the first DC voltage to the processor 210. At this time, the first DC voltage may be transferred from the first timing controller 300-1 to the main board 200 through a first cable 600-1 which connects the first timing controller 300-1 with the main board 200.

The second timing controller 300-2 may also not use, even if the second DC voltage is applied, the applied second DC voltage until the driving signal is applied from the processor 210 (specifically, the microcontroller), and transfer the second DC voltage to the processor 210. At this time, the second DC voltage may be transferred from the second timing controller 300-2 to the main board 200 through a second cable 600-2 which connects the second timing controller 300-2 with the main board 200.

At this time, according to an embodiment of the disclosure, the first cable 600-1 and the second cable 600-2 may be a path for transferring video signals from the main board 200 to the timing controllers 300-1 and 300-2. For example, the first cable 600-1 and the second cable 600-2 may be one connect module (OCM) cables, but are not limited thereto.

The processor 210 may apply the video signal or the driving signal to the first timing controller 300-1 through the first cable 600-1, and receive the first DC voltage from the first timing controller 300-1. In addition, the processor 210 may apply the video signal or the driving signal to the second timing controller 300-2 through the second cable 600-2, and receive the second DC voltage from the second timing controller 300-2.

According to an embodiment of the disclosure, the main board 200 may include an AND gate circuit which includes a first input terminal that receives the first DC voltage transferred from the first timing controller 300-1, a second input terminal that receives the second DC voltage transferred from the second timing controller 300-2, and an output terminal.

The AND gate circuit may output, because a high voltage is output only when the inputs all have high voltages, a high voltage only when the first DC voltage and the second DC voltage are both input in the first and second input terminals.

According to that described above, if the first AC power cable 500-1 is not connected to the first AC power, the first DC voltage may not be provided to the first timing controller 300-1 due to the first AC power not being transferred to the first power supply device 100-1. In addition, in this case, the relay ON signal may not be applied to the second AC inlet board 400-2 due to the PSON signal also not being applied to the main board 200. Accordingly, even if the second AC power cable 500-2 is connected to the second AC power, the second DC voltage may also not be provided to the second timing controller 300-2 due to the second AC power not being transferred from the second AC inlet board 400-2 to the second power supply device 100-2. Accordingly, in this case, not only the first DC voltage, but also the second DC voltage may not be input in the input terminals of the AND gate circuit.

If the second AC power cable 500-2 is not connected to the second AC power, the second DC voltage may not be provided to the second timing controller 300-2 due to the second AC power not being transferred to the second power supply device 100-2. In this case, if the first AC power cable 500-1 is connected to the first AC power, the first DC voltage may be provided to the first timing controller 300-1, but in this case as well, the first DC voltage and the second DC voltage may not all be input in the input terminals of the AND gate circuit.

That is, because the AND gate circuit outputting a high voltage due to the first and second DC voltage both being input in the first and second input terminals is only because the first and second AC power cables 500-1 and 500-2 are both connected to the first and second AC power, the processor 210 may detect whether the first and second AC power cables 500-1 and 500-2 are both connected to the first and second AC power based on an output value of the AND gate circuit.

Accordingly, the processor 210 may apply the driving signals to the first and second timing controllers 300-1 and 300-2 when the first and second AC power cables 500-1 and 500-2 are both connected to the first and second AC power.

At this time, the AND gate circuit may be implemented using a bipolar junction transistor (BJT) or a metal oxide semiconductor field effect transistor (MOSFET), but embodiments are not limited thereto. FIG. 4 illustrates an example of an AND gate circuit 41 implemented using the BJT and an AND gate circuit 42 implemented using an NMOS.

Figure 5:
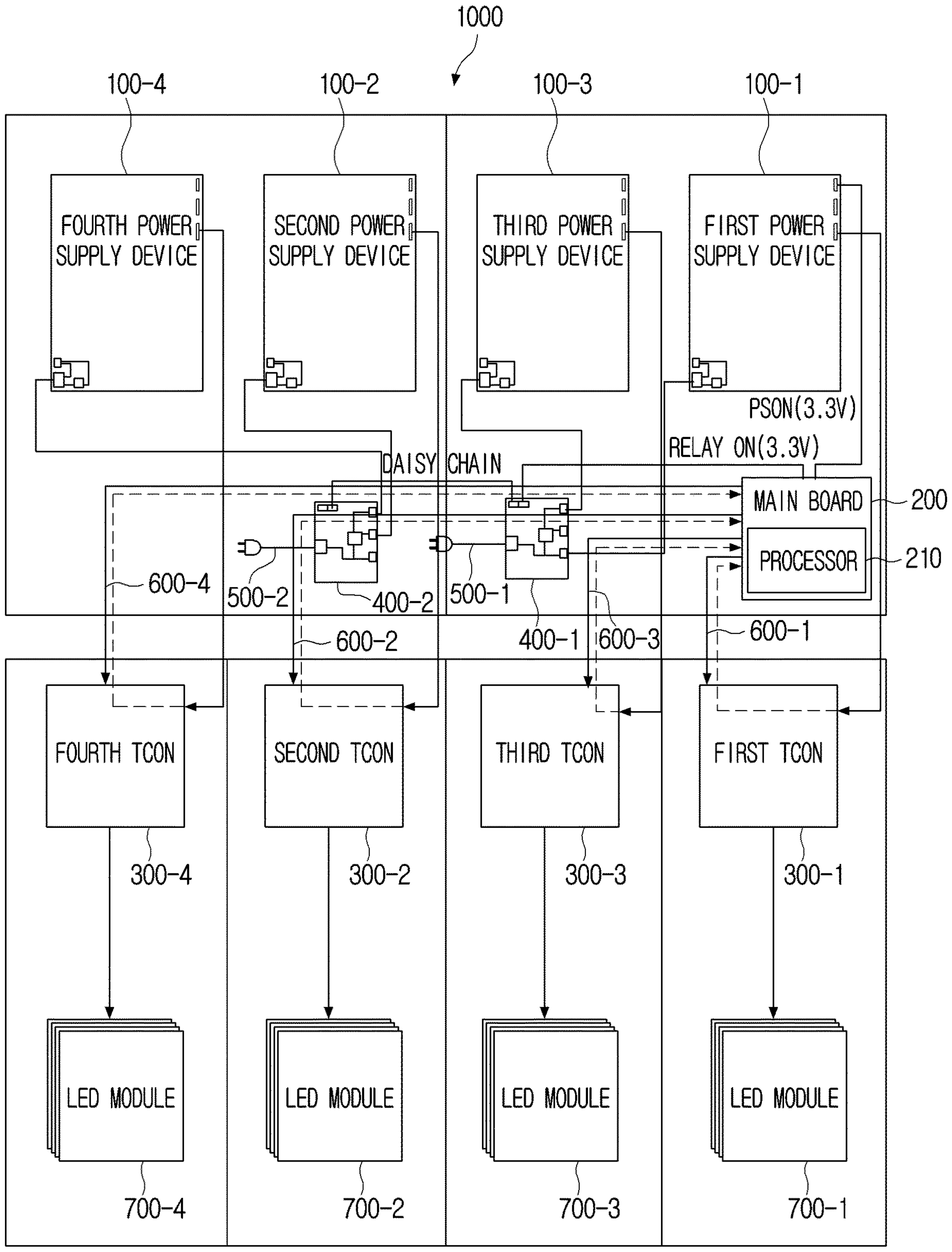
FIG. 5 is a diagram illustrating a configuration of a display device according to an embodiment of the disclosure.

FIG. 5 is a diagram illustrating a configuration of a display device according to an embodiment of the disclosure. Referring to FIG. 5, the display device 1000 may include first to fourth power supply devices 100-1 to 100-4, the main board 200, first to fourth timing controllers 300-1 to 300-4, the first and second AC inlet boards 400-1 and 400-2, the first and second AC power cables 500-1 and 500-2, first to fourth cables 600-1 to 600-4, and LED modules 700-1 to 700-4.

The first to fourth timing controllers 300-1 to 300-4 may drive the LED modules 700-1 to 700-4 respectively based on first to fourth DC voltage applied from the first to fourth power supply devices 100-1 to 100-4, and the driving signals applied through the first to fourth cables 600-1 to 600-4 from the processor 210 of the main board 200.

Specifically, the first AC inlet board 400-1 may receive the first AC power through the first AC cable 500-1, and transfer the input first AC power to first and third power supply devices 100-1 and 100-3.

Accordingly, the first power supply device 100-1 may apply, based on the first AC power being transferred through the first AC cable 500-1, the first DC voltage to the first timing controller 300-1 based on the first AC power. In addition, the third power supply device 100-3 may apply, based on the first AC power being transferred through the first AC cable 500-1, third DC voltage to a third timing controller 300-3 based on the first AC power.

At this time, the first timing controller 300-1 may not use, even if the first DC voltage is applied, the applied first DC voltage until the driving signal is applied from the processor 210 (specifically, the microcontroller), and transfer the first DC voltage to the processor 210. In FIG. 5, arrows shown in dotted lines may indicate the first DC voltage applied from the first power supply device 100-1 to the first timing controller 300-1 being transferred to the processor 210 through the first cable 600-1.

In addition, the third timing controller 300-3 may not use, even if the third DC voltage is applied, the applied third DC voltage until the driving signal is applied from the processor 210 (specifically, the microcontroller), and transfer the third DC voltage to the processor 210. The arrows shown as dotted lines in FIG. 5 may indicate the third DC voltage applied from the third power supply device 100-3 to the third timing controller 300-3 being transferred to the processor 210 through a third cable 600-3.

The second AC inlet board 400-2 may receive the second AC power through the second AC cable 500-2, and transfer the input second AC power to the second and fourth power supply devices 100-2 and 100-4.

Accordingly, the second power supply device 100-2 may apply, based on the second AC power being transferred through the second AC cable 500-2, the second DC voltage to the second timing controller 300-2 based on the second AC power. In addition, the fourth power supply device 100-4 may apply, based on the second AC power being transferred through the second AC cable 500-2, the fourth DC voltage to the fourth timing controller 300-4 based on the second AC power.

At this time, the second timing controller 300-2 may not use, even if the second DC voltage is applied, the applied second DC voltage until the driving signal is applied from the processor 210 (specifically, the microcontroller), and transfer the second DC voltage to the processor 210. The arrows shown as dotted lines in FIG. 5 may indicate the second DC voltage applied from the second power supply device 100-2 to the second timing controller 300-2 being transferred to the processor 210 through the second cable 600-2.

In addition, the fourth timing controller 300-4 may not use, even if the fourth DC voltage is applied, the applied fourth DC voltage until the driving signal is applied from the processor 210 (specifically, the microcontroller), and transfer the fourth DC voltage to the processor 210. The arrows shown as dotted lines in FIG. 5 may indicate the fourth DC voltage applied from the fourth power supply device 100-4 to the fourth timing controller 300-4 being transferred to the processor 210 through the fourth cable 600-4.

In the above, the first to fourth cables 600-1 to 600-4 may be paths for transferring video signals from the main board 200 to the first to fourth timing controllers 300-1 to 300-4. For example, the first to fourth cables 600-1 to 600-4 may be the one connect module (OCM) cables, but are not limited thereto.

The processor 210 may apply video signals or driving signals to the first to fourth timing controllers 300-1 to 300-4 through the first to fourth cables 600-1 to 600-4, respectively. In addition, the processor 210 may receive, as shown with the dotted lined arrows, the first to fourth DC voltage from the first to fourth timing controllers 300-1 to 300-4 through the first to fourth cables 600-1 to 600-4, respectively.

The processor 210 mounted to the main board 200 may apply, based on the first and second AC power cables 500-1 and 500-2 being detected as connected to the first and second AC power based on the first to fourth DC voltage transferred from the first to fourth timing controllers 300-1 to 300-4, the driving signals for driving the timing controllers to the first to fourth timing controllers 300-1 to 300-4, respectively. That is, the processor 210 may not apply, based on even any one of the first to fourth DC voltage not being transferred from the first to fourth timing controllers 300-1 to 300-4, the driving signals to the first to fourth timing controllers 300-1 to 300-4.

To this end, the main board 200 may include an AND gate circuit which includes the first input terminal that receives the first DC voltage transferred from the first timing controller 300-1, the second input terminal that receives the second DC voltage transferred from the second timing controller 300-2, a third input terminal that receives the third DC voltage transferred from the third timing controller 300-3, a fourth input terminal that receives the fourth DC voltage transferred from the fourth timing controller 300-4, and the output terminal, and the processor 210 may detect whether the first and second AC power cables 500-1 and 500-2 are connected to the first and second AC power based on an output value of the AND gate circuit.

The first power supply device 100-1 may apply, based on the first AC power cable 500-1 being connected to the first AC power, the power supply ON (PSON) signal to the main board based on the first AC power transferred through the first AC inlet board 400-1. When the PSON signal is applied from the first power supply device 100-1, the processor 210 may apply the relay ON signal to the first AC inlet board 400-1, and the relay ON signal applied to the first AC inlet board 400-1 may be transferred to the second AC inlet board 400-2. To this end, the main board 200, the first AC inlet board 400-1, and the second AC inlet board 400-2 may be connected in the daisy chain configuration.

The first AC inlet board 400-1 may transfer, based on the first AC power cable 500-1 being connected to the first AC power (or the electrical outlet through which the first AC power is supplied), the input first AC power to the first power supply device 100-1 as is without additional operation. When the first AC power is transferred, the first power supply device 100-1 may apply the PSON signal to the main board 200 based on the first AC power.

In addition, the first AC inlet board 400-1 may transfer, based on the first AC power cable 500-1 being connected to the first AC power, and the relay ON signal being applied from the main board 200 (specifically, the processor 210), the input first AC power to the third power supply device 100-3.

The second AC inlet board 400-2 may transfer, based on the second AC power cable 500-2 being connected to the second AC power, and the relay ON signal being applied through the first AC inlet board 400-1, the input second AC power to the second and fourth power supply devices 100-2 and 100-4.

That is, the first power supply device 100-1 may immediately receive, when the first AC power cable 500-1 is connected to the first AC power, the first AC power through the first AC inlet board 400-1 even if there is no additional control signal such as the relay ON signal. Accordingly, the first power supply device 100-1 may provide the first DC voltage to the first timing controller 300-1, and apply the PSON signal to the main board 200. When the PSON signal is applied, the processor 210 (specifically, the microcontroller) may apply the relay ON signal to the first AC inlet board 400-1 based on the PSON signal.

Conversely, the third power supply device 100-3 may receive, not only when the first AC power cable 500-1 is connected to the first AC power, but also when the relay ON signal is applied to the first AC inlet board 400-1 from the processor 210, the first AC power from the first AC inlet board 400-1, and provide the third DC voltage to the third timing controller 300-3.

The second and fourth power supply devices 100-2 and 100-4 may also receive, not only when the second AC power cable 500-2 is connected to the second AC power, but also when the relay ON signal is applied to the second AC inlet board 400-2 through the first AC inlet board 400-1, the second AC power from the second AC inlet board 400-2, and provide the second and fourth DC voltage to the second and fourth timing controllers 300-2 and 300-4.

The first to fourth DC voltage provided to first to fourth DC timing controllers 300-1 to 300-4 may not be used in the first to fourth DC timing controllers 300-1 to 300-4 until the driving signals are applied from the processor 210, and may be transferred to the main board 200 through the first to fourth cables 600-1 to 600-4, and when the first to fourth DC voltage is input in the AND gate circuit included in the main board 200, the output value of the AND gate circuit may become high and the processor 210 may apply the driving signals to the first to fourth DC timing controllers 300-1 to 300-4.

When the driving signals are applied, the first to fourth DC timing controllers 300-1 to 300-4 may initiate a predetermined operation using the first to fourth DC voltage, and accordingly, each of the LED modules 700-1 to 700-4 may be driven.

Because the first to fourth DC voltage all being input in the input terminals of the AND gate circuit is because the first and second AC cables 500-1 and 500-2 are all connected to the AC power, the first to fourth DC timing controllers 300-1 to 300-4 may not start driving until the first and second AC cables 500-1 and 500-2 are all connected to the AC power.

Accordingly, failure of a power supply device due to the rush current which can generate as described above in a product that uses a plurality of AC power cables may be prevented.

The number of AC power cables of the display device 1000 described above and the number of AC inlet boards based therefrom are merely one example, and embodiments are not limited thereto. That is, according to an embodiment, three or more AC power cables and an AC inlet board may be included in one display device 1000.

In addition, the number of power supply devices or the number of timing controllers in the display device 1000 are also an example, and the embodiments are not limited to that described above. In addition, the corresponding relationship of the AC inlet boards and the power supply devices or the corresponding relationship of the power supply devices and the timing controllers are also an example, and embodiments are not limited to that described above.

In an example, one power supply device may provide DC voltage to a plurality of timing controllers, one timing controller may drive a plurality of LED modules, and one AC inlet board may transfer AC power to three or more power supply devices.

In the above, the display device 1000 has been provided as an example, but embodiments are not limited thereto. That is, configurations may be partially changed according to the types of electronic devices implemented in the embodiments of the disclosure, but the various embodiments of the disclosure described above may be applied to other electronic devices that use a plurality of AC power cables.

The various embodiments of the disclosure may be implemented with software including instructions stored in a machine-readable storage media (e.g., computer). Here, the machine may call a stored instruction from a storage medium, and as a device operable according to the called instruction, may include the display device 1000 according to the above-mentioned embodiments.

Based on the instruction being executed by various processors, the processor may directly or using other elements under the control of the processor perform a function corresponding to the instruction. The instruction may include a code generated by a compiler or executed by an interpreter. A machine-readable storage medium may be provided in a form of a non-transitory storage medium. Herein, 'non-transitory' merely means that the storage medium is tangible and does not include a signal, and the term does not differentiate data being semi-permanently stored or being temporarily stored in the storage medium.

According to an embodiment, a method according to the various embodiments described in the disclosure may be provided included a computer program product. The computer program product may be exchanged between a seller and a purchaser as a commodity. The computer program product may be distributed in a form of the machine-readable storage medium (e.g., a compact disc read only memory (CD-ROM)), or distributed online through an application store (e.g., PLAYSTORE™). In the case of online distribution, at least a portion of the computer program product may be stored at least temporarily in the storage medium such as a server of a manufacturer, a server of an application store, or a memory of a relay server, or temporarily generated.

Respective elements (e.g., a module or a program) according to various embodiments may be configured as a single entity or a plurality of entities, and a portion of sub-elements of the above-mentioned sub-elements may be omitted, or other sub-elements may be further included in the various embodiments. Alternatively or additionally, a portion of the elements (e.g., modules or programs) may be integrated into one entity to perform the same or similar functions performed by the respective corresponding elements prior to integration. Operations performed by a module, a program, or other element, in accordance with the various embodiments, may be executed sequentially, in parallel, repetitively, or in a heuristically manner, or at least a portion of the operations may be performed in a different order, omitted, or a different operation may be added.

While the disclosure has been illustrated and described with reference to various example embodiments thereof, it will be understood that the various example embodiments are intended to be illustrative, not limiting. It will be understood by those skilled in the art that various changes in form and details may be made therein without departing from the true spirit and full scope of the disclosure, including the appended claims and their equivalents.

What is claimed is:

1. A display device comprising:
- a first timing controller;
- a first power supply device configured to provide, based on a first alternating current (AC) power being transferred through a first AC power cable, a first direct current (DC) voltage to the first timing controller based on the first AC power;
- a second timing controller;
- a second power supply device configured to provide, based on a second AC power being transferred through a second AC power cable, a second DC voltage to the second timing controller based on the second AC power; and
- a main board connected to the first timing controller and the second timing controller, and comprising at least one processor,
- wherein the at least one processor is configured to:
  - detect the first AC power cable as being connected to the first AC power based on receiving the first DC voltage from the first timing controller,
  - detect the second AC power cable as being connected to the second AC power based on receiving the second DC voltage from the second timing controller, and
  - based on detecting that the first AC power cable is connected to the first AC power and that the second AC power cable is connected to the second AC power, apply driving signals to the first timing controller and the second timing controller.

2. The display device of claim 1, wherein the at least one processor is further configured to, based on at least one of the first DC voltage not being transferred from the first timing controller or the second DC voltage not being transferred from the second timing controller, not apply the driving signals to the first timing controller and the second timing controller.

3. The display device of claim 1, wherein the main board further comprises:
- an AND gate circuit comprising:
  - a first input terminal configured to receive the first DC voltage from the first timing controller,
  - a second input terminal configured to receive the second DC voltage from the second timing controller, and
  - an output terminal, and
- wherein the at least one processor is further configured to detect whether the first AC power cable is connected to the first AC power and the second AC power cable is connected to the second AC power based on an output value of the AND gate circuit.

4. The display device of claim 3, wherein the AND gate circuit further comprises a bipolar junction transistor (BJT) or a metal oxide semiconductor field effect transistor (MOSFET).

5. The display device of claim 1, further comprising:
- a first cable connecting the first timing controller with the main board; and
- a second cable connecting the second timing controller with the main board,
- wherein the at least one processor is further configured to:
  - apply video data and the driving signals to the first timing controller through the first cable and to the second timing controller through the second cable, respectively, and
  - receive the first DC voltage from the first timing controller through the first cable and the second DC voltage from the second timing controller through the second cable.

6. The display device of claim 5, wherein each of the first cable and the second cable is a one connect module (OCM) cable.

7. The display device of claim 1, further comprising:
- a first AC inlet board configured to receive the first AC power through the first AC power cable, and transfer the first AC power to the first power supply device; and
- a second AC inlet board configured to receive the second AC power through the second AC power cable, and transfer the second AC power to the second power supply device.

8. The display device of claim 7, wherein the main board, the first AC inlet board, and the second AC inlet board are connected via a daisy chain configuration.

9. The display device of claim 7, wherein the first power supply device is further configured to, based on the first AC power cable being connected to the first AC power, apply a power supply ON (PSON) signal to the main board based on the first AC power transferred through the first AC inlet board, and
- wherein the at least one processor is further configured to apply, based on the PSON signal, a relay ON signal to the first AC inlet board.

10. The display device of claim 9, wherein the first AC inlet board is further configured to, based on the first AC power cable being connected to the first AC power, transfer the first AC power to the first power supply device, and
- wherein the second AC inlet board is further configured to, based on the second AC power cable being connected to the second AC power, and the relay ON signal being applied to the first AC inlet board, transfer the second AC power to the second power supply device.

11. The display device of claim 1, further comprising:
- a first cable connecting the first timing controller with the main board;
- a second cable connecting the second timing controller with the main board;
- a third timing controller;
- a third power supply device configured to apply, based on the first AC power being transferred through the first cable, a third DC voltage to the third timing controller based on the first AC power;

a fourth timing controller; and a fourth power supply device configured to apply, based on the second AC power being transferred through the second cable, a fourth DC voltage to the fourth timing controller based on the second AC power, wherein the at least one processor is further configured to:

based on the first AC power cable being detected as connected to the first AC power based on the first DC voltage transferred from the first timing controller and the third DC voltage transferred from the third timing controller, and based on the second AC power cable being detected as connected to the second AC power based on the second DC voltage transferred from the second timing controller and the fourth DC voltage transferred from the fourth timing controller, apply the driving signals to the first timing controller, the second timing controller, the third timing controller, and the fourth timing controller.

12. The display device of claim 11, wherein the at least one processor is further configured to, based on at least one of the first DC voltage not being transferred from the first timing controller, the second DC voltage not being transferred from the second timing controller, the third DC voltage not being transferred from the third timing controller, or the fourth DC voltage not being transferred from the fourth timing controller, not apply the driving signals to the first timing controller, the second timing controller, the third timing controller, and the fourth timing controller.

13. The display device of claim 11, wherein the main board further comprises:

an AND gate circuit comprising:

a first input terminal configured to receive the first DC voltage from the first timing controller, a second input terminal configured to receive the second DC voltage from the second timing controller, a third input terminal configured to receive the third DC voltage from the third timing controller, a fourth input terminal configured to receive the fourth DC voltage from the fourth timing controller, and an output terminal, and wherein the at least one processor is further configured to:

detect whether the first AC power cable is connected to the first AC power and the second AC power cable is connected to the second AC power based on an output value of the AND gate circuit.

14. The display device of claim 11, further comprising:

a third cable connecting the third timing controller with the main board; and a fourth cable connecting the fourth timing controller with the main board, wherein the at least one processor is further configured to:

apply video data and the driving signals to the first timing controller through the first cable, to the second timing controller through the second cable, to the third timing controller through the third cable, and to the fourth timing controller through the fourth cable, respectively, and receive the first DC voltage from the first timing controller through the first cable, the second DC voltage from the second timing controller through the second cable, the third DC voltage from the third timing controller through the third cable, and the fourth DC voltage from the fourth timing controller through the fourth cable.

15. The display device of claim 11, further comprising:

a first AC inlet board configured to receive the first AC power through the first AC power cable, and transfer the first AC power to the first power supply device and the third power supply device; and a second AC inlet board configured to receive the second AC power through the second AC power cable, and transfer the second AC power to the second power supply device and the fourth power supply device.

16. The display device of claim 1, further comprising a plurality of light emitting diode (LED) modules, wherein the first timing controller and the second timing controller are configured to, based on the driving signals being applied by the at least one processor, drive the plurality of LED modules using the first DC voltage and the second DC voltage.

* * * * *